(No Model.)
J. S. LURIE.
LIQUID FOR SEPARATING METALS FROM QUARTZ OR OTHER GANGUE.
No. 454,116. Patented June 16, 1891.
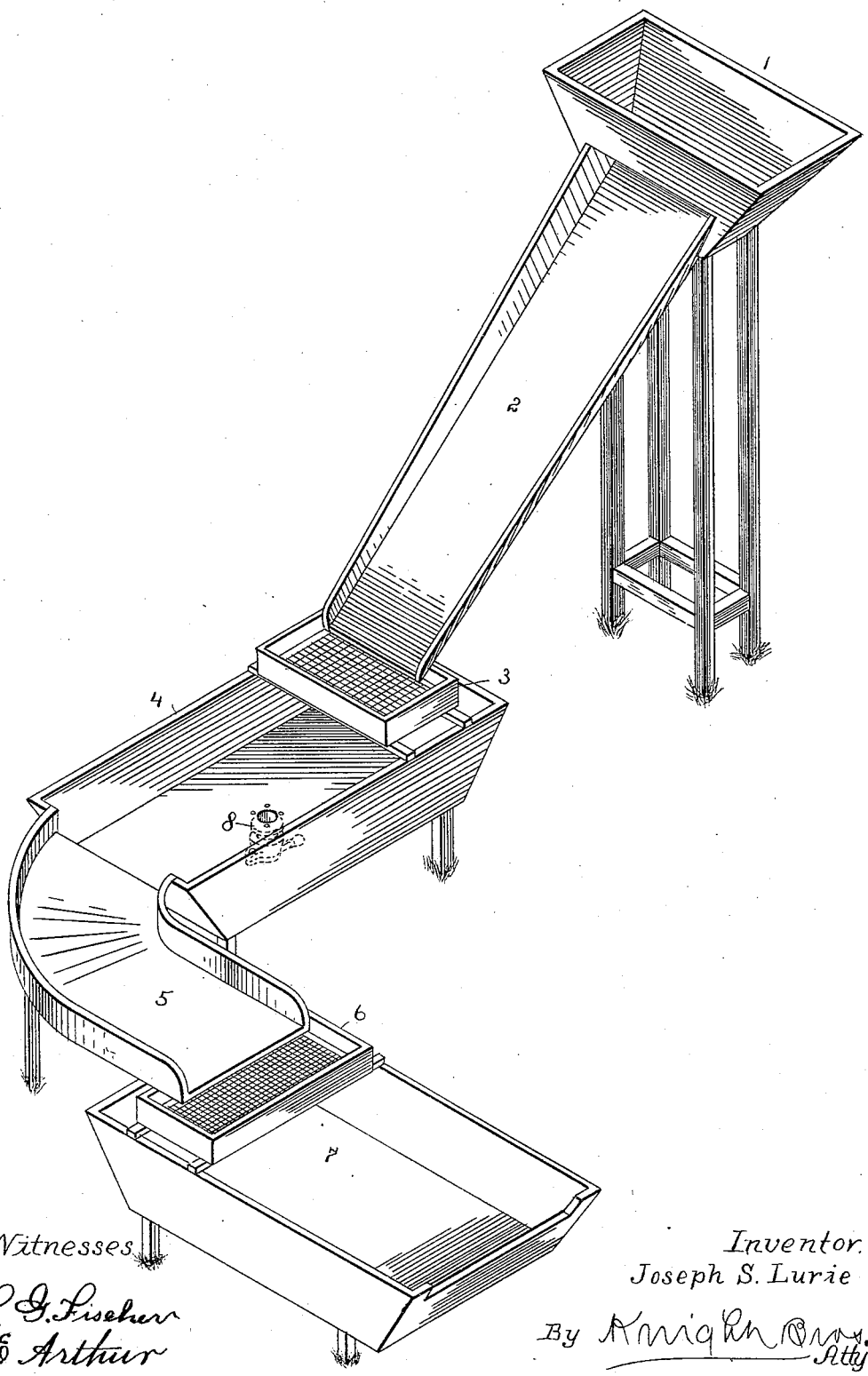
Witnesses
F. G. Fischer
E. Arthur
Inventor.
Joseph S. Lurie
By Knight Bros.
Attys.

UNITED STATES PATENT OFFICE.

JOSEPH S. LURIE, OF KANSAS CITY, MISSOURI.

LIQUID FOR SEPARATING METALS FROM QUARTZ OR OTHER GANGUE.

SPECIFICATION forming part of Letters Patent No. 454,116, dated June 16, 1891.

Application filed March 5, 1890. Serial No. 342,771. (No specimens.)

*To all whom it may concern:*

Be it known that I, JOSEPH S. LURIE, of Kansas City, in the county of Jackson and State of Missouri, have invented a certain new and useful Liquid for Separating Metals from Quartz or other Gangue, of which the following is a full, clear, and exact description, reference being had to the accompanying drawing, in which a means for carrying out my process is shown.

My invention relates to a new process by which the metal is separated from the quartz or gangue; and my invention consists in features of novelty hereinafter described, and pointed out in the claims.

After the quartz has been passed through the stamping-mill or crusher I pass the same into a vessel containing water and a liquid which is insoluble in water, which is of greater specific gravity than water, and which is also of greater specific gravity than the quartz, but which is of less specific gravity than the metals mixed with the quartz. It will thus be seen that the quartz will float with the water on the surface of the liquid, which is of greater specific gravity than the quartz and water, and that the metal that has been held by the quartz until the same has been crushed will be precipitated through said liquid.

In the accompanying drawing, which is a perspective view of a device by which means my invention may be carried out, 1 represents a hopper for receiving the ore as it comes in its pulverized condition from the crusher, the ore passing from the hopper down a chute 2 through a screen 3, where it passes into a trough or receptacle 4. In the trough 4 I place a sufficient quantity of my liquid, of greater specific gravity than the quartz, and allow water to flow over the same. The metal will of course be precipitated to the bottom of the trough through the liquid, and the quartz will pass off with the water through a sluiceway 5. At the lower end of the sluiceway 5 I place an additional screen 6, through which the finer particles of the quartz and any portion of the metals that have not been precipitated pass into an additional trough 7, said trough 7 also containing a portion of the above-described liquid.

It is obvious that any number of troughs and screens that may be desired can be used. The screens may be graded, as shown, to prevent the larger particles of quartz from entering the trough. 8 represents a spigot in the trough 4, by which means the concentrates or precipitated metals may be drawn off.

I will now describe the liquids used in my process and the proportionate amounts of the same for successfully carrying out my process.

I use certain ingredients or liquids, which for convenience I will name liquid No. 1, liquid No. 2, liquid No. 3, and liquid No. 4. Liquid No. 1 is obtained in the following way: By the action of bromine on alcohol I get a fluid which by distilling at a temperature of 280° Fahrenheit is decomposed into two parts, one of which remains in the retort and the second is distilled over into the receiver. The fluid which remains in the retort is taken out and decomposed by a caustic alkali, forming a bromide of the alkali and a heavy fluid at the bottom. The last-named fluid, being carefully washed and of a specific gravity of nearly 4, constitutes my liquid No. 1. For the liquid No. 2 I use the tetrabromethane ($C_2H_2Br_4$) mentioned in any extensive chemistry; but I take care that if the liquid is prepared with acetylene the acetylene should be obtained in a perfectly pure state. Liquid No. 3 is made as follows: In preparing liquid No. 1 I receive a part which is distilled over into the receiver. This liquid is separated from the water which is on top of it, and combined with pure acetylene is changed into a liquid of a specific gravity of about 2, thus forming my liquid No. 3. Any methyl-propyl-benzene or cymene being dissolved in alcohol gives my liquid No. 4. These four liquids can be combined by two, three, or all together in the proper proportions to give a mixture of a specific gravity greater than any quartz or gangue, but of less specific gravity than the metals therein contained.

It is obvious that in treating the quartz the proportions of the various liquids must be regulated according to the specific gravity of the quartz being treated. Consequently I do not confine myself to any specific proportions of the same. The following proportions which I have used in the treatment of the following ores will enable any one skilled in the art to perform the same.

In treating carbonate ore of 1.8 specific gravity I use one-half part of liquid No. 1, two parts of liquid No. 2, one part of liquid No. 3, and one-half part of liquid No. 4.

In treating white-quartz ore of 2 specific gravity I use one part of liquid No. 1, two parts of liquid No. 2, and one part of liquid No. 4.

It will be seen that the liquid employed is a non-metallic and a non-mixing one—that is to say, it will not unite with the metals to be operated upon.

I claim as my invention—

1. As a new article of manufacture, a non-metallic liquid of greater specific gravity than the quartz or gangue, but of less specific gravity than the metals contained in the quartz or gangue, substantially as described, and for the purpose set forth.

2. A concentrating-liquid consisting of the combination of two or more of the above-described liquids, whereby a mixture is formed which will be of greater specific gravity than the quartz being treated, but of less specific gravity than the metals contained in the quartz, substantially as described, and for the purpose set forth.

3. A concentrating-liquid consisting of two or more of the herein-described liquids 1, 2, 3, and 4, liquid No. 1 being formed by causing bromine to act on alcohol, dissolving the product and decomposing the same into two parts, decomposing the heavy part by a caustic alkali, thereby forming a bromide of the alkali and the heavier fluid at the bottom, which heavier fluid constitutes the said liquid No. 1, liquid No. 2 being a tetrabromethane, ($F_2H_2Br_4$,) liquid No. 3 being produced by combining with acetylene the dissolved portion of bromine and alcohol first mentioned, and liquid No. 4 consisting of any methyl-propyl-benzene and cymene dissolved in alcohol.

JOSEPH S. LURIE.

Witnesses:
 JAS. E. KNIGHT,
 LEO WIENER.